United States Patent [19]
Chen

[11] Patent Number: 5,703,719
[45] Date of Patent: Dec. 30, 1997

[54] REFLECTOR ROAD SIGN WITH SELF-PROVIDED LIGHT MEANS

[76] Inventor: Judy Chen, P.O. Box 372, Hsin-Chu, Taiwan

[21] Appl. No.: 784,496

[22] Filed: Jan. 17, 1997

[51] Int. Cl.$^6$ .................. G02B 5/136; G02B 5/12
[52] U.S. Cl. .................. 359/547; 359/515; 359/551; 359/552; 404/16
[58] Field of Search .................. 359/515, 527, 359/531, 532, 547, 551, 552; 404/12–16; 116/63 R; 362/183, 186; 340/331

[56] References Cited

U.S. PATENT DOCUMENTS

| | | | |
|---|---|---|---|
| 4,050,834 | 9/1977 | Lee | 359/547 |
| 4,668,120 | 5/1987 | Roberts | 404/16 |
| 5,003,441 | 3/1991 | Crowe et al. | 362/183 |
| 5,365,372 | 11/1994 | Chen | 359/515 |
| 5,453,729 | 9/1995 | Chu | 340/331 |

Primary Examiner—James Phan

[57] ABSTRACT

A reflector road sign including a reflector body made of a tempered glass having $Fe_2O_3$ content below 0.3%, a casing made to receive the reflector body, a solar lighting system installed in the reflector body, the solar lighting system including a LED (light emitting diode) lamp, a solar cell assembly, a rechargeable battery connected to the solar cell assembly, a control circuit connected to the rechargeable battery and the LED lamp and controlling the LED lamp to operate when the intensity of ambient light drops below a predetermined level, and a reflecting device mounted around the LED lamp to reflect light in desired directions.

12 Claims, 3 Drawing Sheets

REFLECTOR ROAD SIGN WITH SELF-PROVIDED LIGHT MEANS

BACKGROUND OF THE INVENTION

The present invention relates to road signs, and more particularly to such a reflector road sign which reflects light during the day, and emits light when dark.

U.S. Pat. No. 5,365,372 and Germany Pat. No. G 93 16 911.6 disclose a reflector road sign, which is issued to the present inventor, comprising a reflector body received within a casing, the reflector body being made of a tempered glass and having the lower half part covered with a reflector paper, the casing having a corrugated inside surface covered with a layer of bonding resin for binding the reflector body and a plurality of recesses spaced around the outside wall thereof for binding to the mounting hole on the road by a bonding resin. This structure of reflector road sign is a passive design which does not emit light for warning.

SUMMARY OF THE INVENTION

According to one aspect of the present invention, the reflector road sign is comprised of a reflector body made of a tempered glass having $Fe_2O_3$ content below 0.3%, a casing made to receive the reflector body, a solar lighting system installed in the reflector body, the solar lighting system including a LED (light emitting diode) lamp, a solar cell assembly, a rechargeable battery connected to the solar cell assembly, a control circuit connected to the solar cell assembly and the rechargeable battery and controlling the LED lamp to operate when the intensity of ambient light drops below a predetermined level, and a reflecting device mounted around the LED lamp to reflect light in desired directions. According to another aspect of the present invention, the reflector body is peripherally covered with a layer of reflecting paper to reflect light. As an alternate form of the present invention, the reflector body is peripherally coated with a layer of reflecting coating. According to still another aspect of the present invention, the electrical energy obtained from the solar cell is stored in the rechargeable battery for driving the LED lapm when dark. According to still another aspect of the present invention, the reflecting device of the solar lighting system comprises a shield mounted around the LED lamp, the shield having an axial bottom center hole which receives the LED lamp, and a tapered top opening narrowing toward the axial bottom center hole and coated with a layer of reflecting coating for reflecting the light of the LED lamp horizontally in 360° angle. As an alternate form of the shield, the shield has an axial center hole which receives the LED lamp, and a V-shaped top edge covered with a layer of reflecting coating for reflecting the light of the LED lamp horizontally in reversed directions.

The advantages of the reflector road sign of the present invention are numerous and outlined hereinafter.

1) It provides high performance because it reflects light in 360° angle or horizontally in reversed directions.

2) It is easy to maintain because the reflector body has a smooth outside surface which does not adhere dust.

3) It is durable in use because the reflector body is made of a tempered glass.

4) It does not hinder the traffic because the reflector body has a smoothly curved top side.

5) It is safe in use and does not do damage to car tires because the reflector body is made of a tempered glass which does not deform when run over by motor vehicles.

6) It provides a wider reflecting area and a stronger reflecting effect because a high-performance reflector paper is used.

7) It saves the expenses in replacing reflector road signs because it is durable in use.

8) It provides a broad reflecting area.

9) It is easy to install without any special techniques.

DETAILED DESCRIPTION OF THE PREFERRED EMBODIMENT

Figure 1:
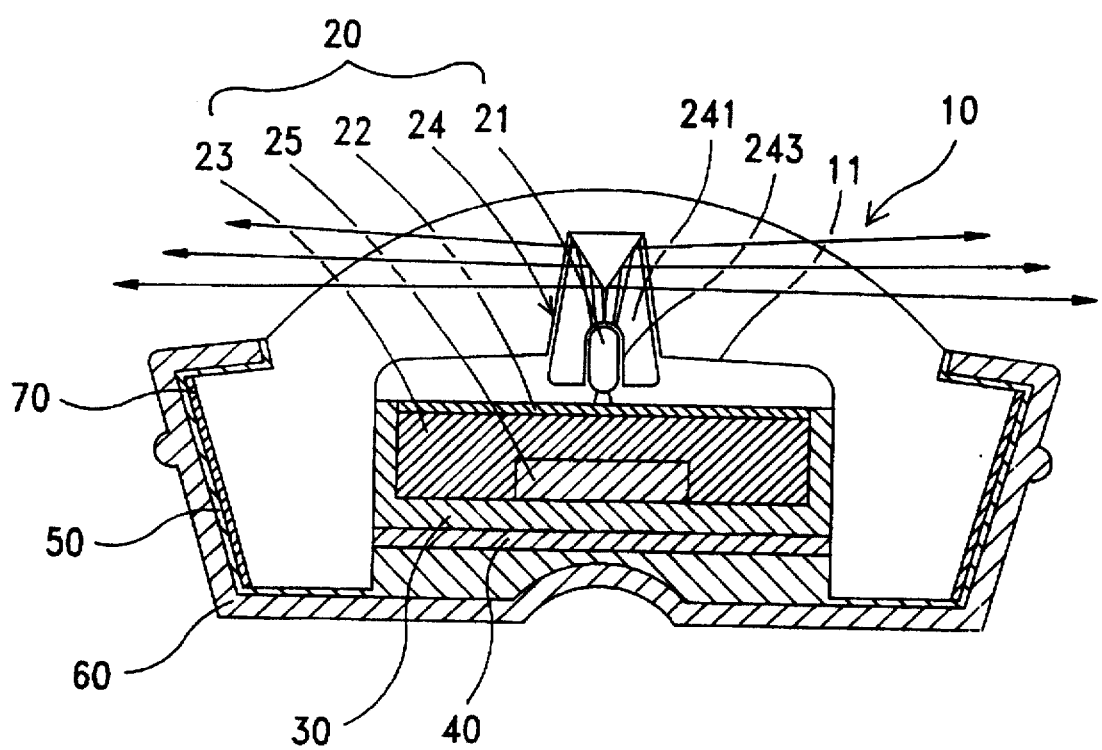
FIG. 1 is a sectional view of a reflector road sign according to the present invention.
Figure 2:
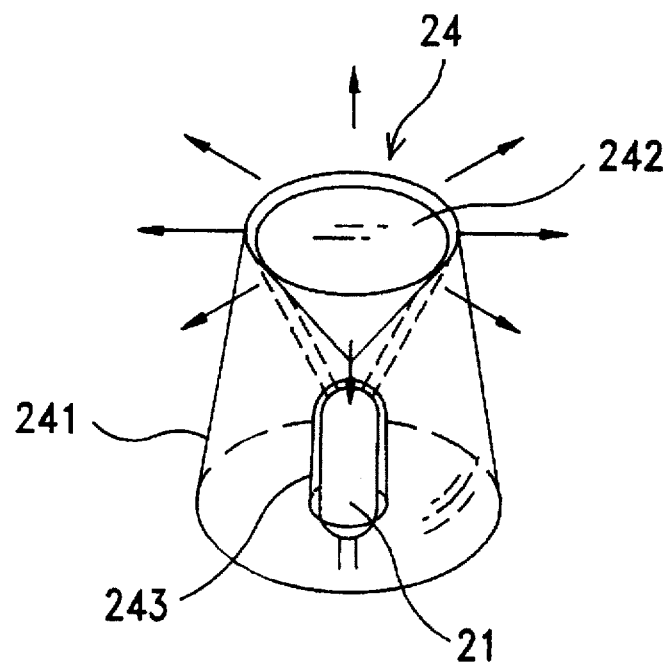
FIG. 2 is a perspective view of the shield of the solar lighting system of the reflector road sign according to the present invention.

Referring to FIGS. 1 and 2, the reflector body, referenced by 10, is made of a tempered glass having $Fe_2O_3$ content below 0.3%, which permits the light of the sun to pass. Because the reflector body 10 is made of a tempered glass, it does not do damage to car tires. The reflector body 10 has a bottom chamber 11. A solar lighting system 20 is mounted within the bottom chamber 11 of the reflector body 10. The solar lighting system 20 comprises a LED (light emitting diode) lamp 21, a solar cell assembly 22, a control circuit 23, a reflecting device 24, and a rechargeable battery 25. The reflecting device 24 comprises a shield 241 made of weather-resisting, transparent engineering plastic and mounted around the LED lamp 21. The shield 241 has an axial bottom chamber 243 at the center which receives the LED lamp 21, and a tapered top opening 242 vertically disposed in communication with the bottom chamber 243. The diameter of the tapered top opening 242 gradually reduces from the top towards the bottom chamber 243. The tapered top opening 242 is peripherally coated with a layer of a reflecting coating. When the LED lamp 21 is electrically connected to give off light, the upward light rays are reflected by the reflecting coating of the tapered top opening 242 into horizontal light rays in 360° angle.

Figure 3:
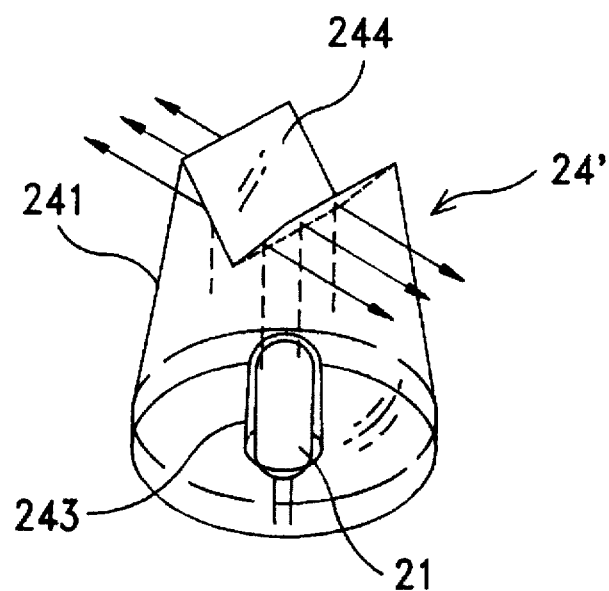
FIG. 3 is a perspective view of an alternate form of the shield according to the present invention.

FIG. 3 shows an alternate form of the reflecting device. According to this alternate form, the shield 241 of the reflecting device 24' comprises an axial bottom chamber 243 at the center which receives the LED lamp 21, and a V-shaped top edge 244. The V-shaped top edge 244 reflects the light of the LED lamp 21 horizontally in reversed directions.

Referring to FIG. 1 again, the LED lamp 21 can be a red color LED lamp or yellow color LED lamp. The solar battery assembly 22 converts sunlight into electrical energy, permitting it to be further stored in the rechargeable battery 25. The rechargeable battery 25 provides the necessary working voltage to the control circuit 23 and the LED lamp 21. The control circuit 23 controls the LED lamp 21 to emit light (or to flash) when the intensity of ambient light drops below a predetermined low level. This control can be achieved by means of, for example, the operation of photoswitch means. When the intensity of ambient light surpasses a predetermined high level, the control circuit 23 immediately cuts off battery power supply from the LED lamp 21.

Referring to FIG. 1 again, flexible stuffing material 30 is filled in the bottom chamber 11 of the reflector body 10 around the solar lighting system 20 to protect the solar lighting system 20 against shock waves. A flexible insulative cover plate 40 is covered on the bottom chamber 11 of the reflector body 10 to stop water from passing to the inside of the bottom chamber 11 of the reflector body 10.

Figure 4:
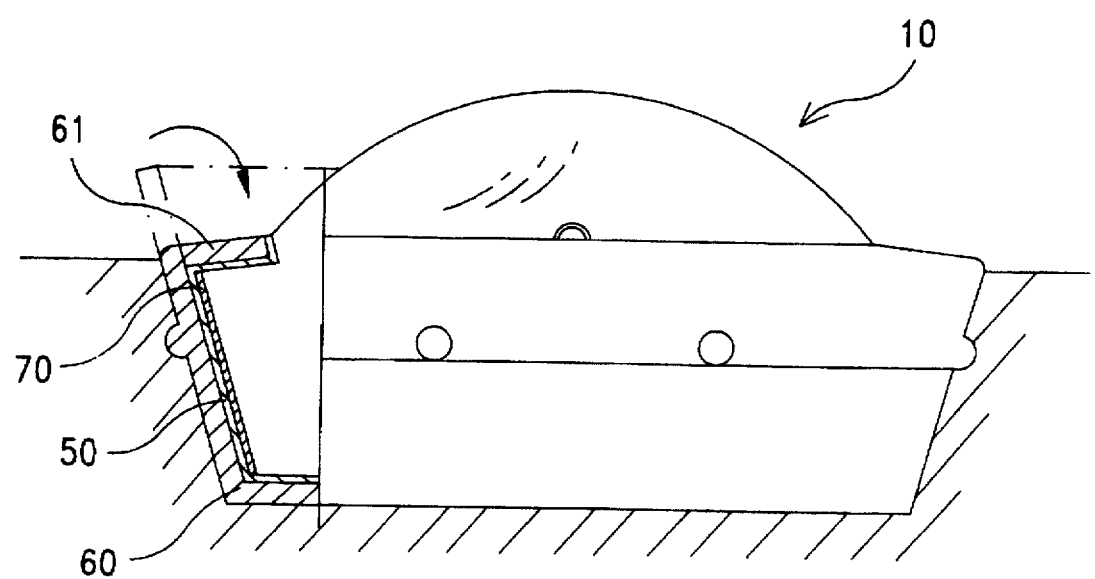
FIG. 4 is a schematic drawing showing the installation of the reflector road sign in a hole in the road.

Referring to FIG. 4 and FIG. 1 again, the reflector body 10 is received within a casing 60. A layer of bonding resin for example epoxy resin 50 is covered over the inside wall of the casing 60 for binding the casing 60 and the reflector body 10 together. A reflecting paper 70 may be adhered to the periphery of the reflector body 10 to reflect light towards the top side. Alternatively, the periphery of the reflector body 10 may be directly coated with a layer of reflecting coating. When the reflector body 10 is installed in the casing 60 and the casing 60 is mounted in embedded in the road, the top flange 61 of the casing 60 is hammered down to firmly secure the reflector body 10 to the inside of the casing 60.

It is to be understood that the drawings are designed for purposes of illustration only, and are not intended as a definition of the limits and scope of the invention disclosed.

What the invention claimed is:

1. A reflector road sign comprising a reflector body made of a tempered glass; a casing made to receive said reflector body, wherein said reflector body has a bottom chamber; a solar lighting system is installed in the bottom chamber of said reflector body, said solar lighting system comprising a LED (light emitting diode) lamp, a solar cell assembly, a rechargeable battery connected to said solar cell assembly, a control circuit connected to said rechargeable battery and said LED lamp and controlling said LED lamp to operate when an intensity of ambient light drops below a predetermined level, and a reflecting device mounted around said LED lamp to reflect light.

2. The reflector road sign of claim 1 wherein flexible stuffing material is filled in said bottom chamber of said reflector body around said solar lighting system to protect said solar lighting system against shock waves.

3. The reflector road sign of claim 2 wherein the bottom chamber of said reflector body is covered with a flexible insulative cover plate to stop water from passing to an inside of said reflector body.

4. The reflector road sign of claim 1 further comprising a layer of bonding resin covered over an inside wall of said casing for binding said casing and said reflector body together.

5. The reflector road sign of claim 1 wherein said reflector body is peripherally covered with a reflecting paper.

6. The reflector road sign of claim 1 wherein said reflector body is peripherally coated with a layer of reflecting coating.

7. The reflector road sign of claim 1 wherein the reflecting device of said solar lighting system comprises a shield covered around said LED lamp, said shield having an axial bottom center hole which receives said LED lamp, and a tapered top opening narrowing toward said axial bottom center hole.

8. The reflector road sign of claim 7 wherein the tapered top opening of the shield of the reflecting device of said solar lighting system is peripherally coated with a reflecting coating.

9. The reflector road sign of claim 1 wherein the reflecting device of said solar lighting system comprises a shield covered around said LED lamp, said shield having an axial bottom center hole which receives said LED lamp, and a V-shaped top edge.

10. The reflector road sign of claim 8 wherein the V-shaped top edge of the shield of the reflecting device of said solar lighting system is covered with a reflecting coating.

11. The reflector road sign of claim 1 wherein said control circuit controls said LED lamp to flash when the intensity of ambient light drops below the predetermined level.

12. The reflector road sign of claim 1 wherein said tempered glass has $Fe_2O_3$ content below 0.3%.

* * * * *